United States Patent [19]

Winter et al.

[11] Patent Number: 5,129,429
[45] Date of Patent: Jul. 14, 1992

[54] FLEXIBLE HOSE CONSTRUCTION

[75] Inventors: Jeffrey J. Winter, Ocala, Fla.; Homer N. Holden, Sylva, N.C.; James L. Lawrence, Ocala, Fla.

[73] Assignee: Dayco Products, Inc., Dayton, Ohio

[21] Appl. No.: 575,777

[22] Filed: Aug. 31, 1990

Related U.S. Application Data

[63] Continuation-in-part of Ser. No. 405,487, Sep. 11, 1989, Pat. No. 5,089,074.

[51] Int. Cl.⁵ .............................. F16L 11/08
[52] U.S. Cl. ........................ 138/121; 138/122; 138/125; 138/129; 138/132; 138/137
[58] Field of Search ............ 138/121, 122, 172, 173, 138/177, 178, 124, 125, 126, 103, 132, 133, 129, 137, 104

[56] References Cited

U.S. PATENT DOCUMENTS

| | | | |
|---|---|---|---|
| 2,913,011 | 11/1959 | Noyes et al. | 138/133 |
| 3,117,596 | 1/1964 | Kahn | 138/122 |
| 3,152,618 | 10/1964 | Rothermel et al. | 138/122 |
| 3,715,454 | 2/1973 | Kleykamp | 138/122 |
| 3,872,893 | 3/1975 | Roberts | 138/121 |
| 4,157,101 | 6/1979 | Ross | 138/132 |
| 4,312,383 | 1/1982 | Kleykamp | 138/103 |
| 4,351,366 | 9/1982 | Angioletti | 138/137 |
| 4,415,389 | 11/1983 | Medford et al. | 156/91 |
| 4,982,765 | 1/1991 | Usui | 138/122 |

FOREIGN PATENT DOCUMENTS 1116  1/1894  United Kingdom ............ 138/122

Primary Examiner—James E. Bryant, III
Attorney, Agent, or Firm—Joseph V. Tassone

[57] ABSTRACT

A flexible hose construction and method of making the same are provided, the flexible hose construction comprising an inner corrugated hose made of polymeric material and having a plurality of outwardly facing convex projections with outwardly facing recesses therebetween and extending from one end thereof to the other end thereof, the inner hose having a plurality of inwardly facing convex projections with inwardly facing recesses therebetween and extending from the one end thereof to the other end thereof, an outer sleeve of reinforcing material disposed in telescoping relation on the inner hose, a first tube of polymeric material disposed between the sleeve of reinforcing material and the inner hose and having an inner peripheral surface engaging the outwardly facing convex projections in a generally straight-line manner from the one end thereof to the other end thereof so as to tend to prevent the sleeve of reinforcing material from entering into the outwardly facing recesses of the inner hose an amount that would tend to substantially reduce the flexibility characteristics of the inner hose, and a second tube of polymeric material disposed inside the inner hose and having an outer peripheral surface engaging the inwardly facing convex projections in a generally straight-line manner from the one end thereof to the other end thereof.

9 Claims, 4 Drawing Sheets

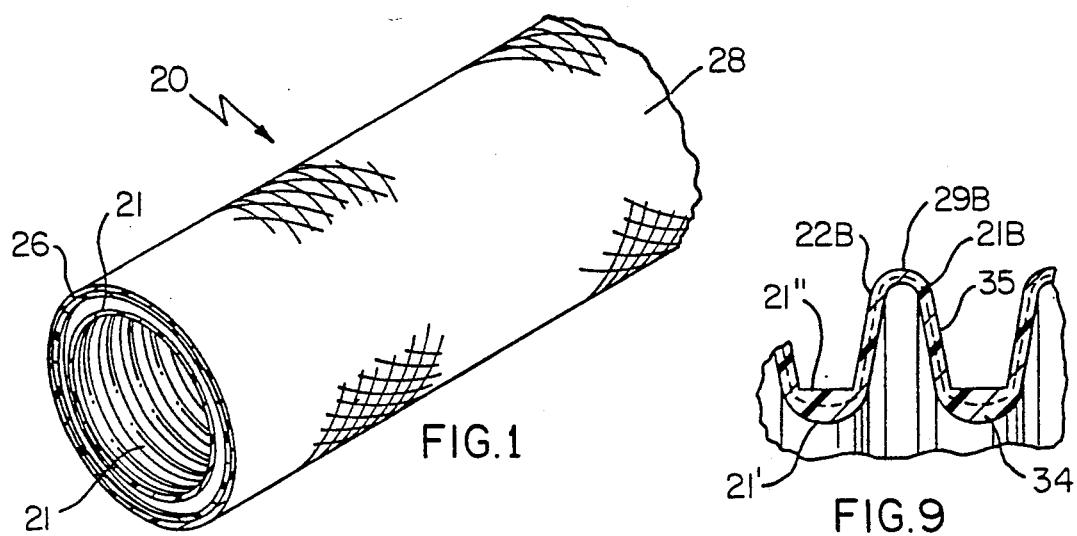
FIG.1
FIG.9
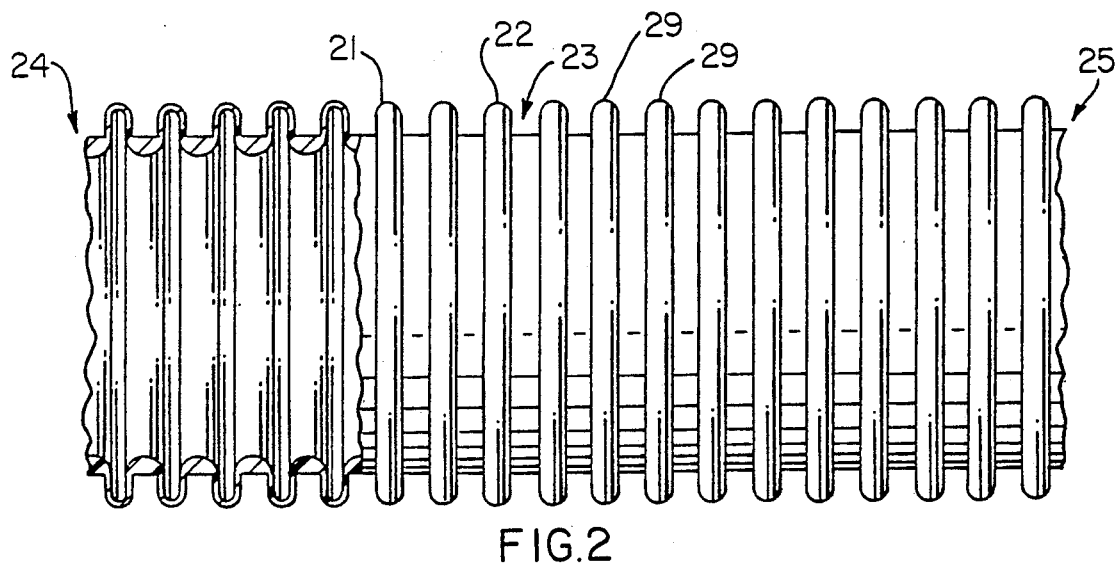
FIG.2
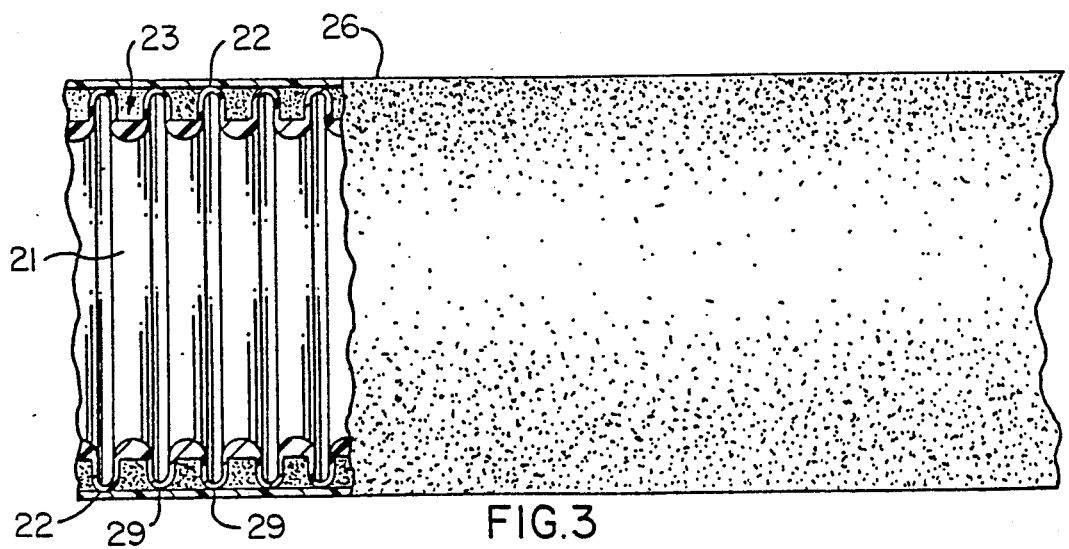
FIG.3

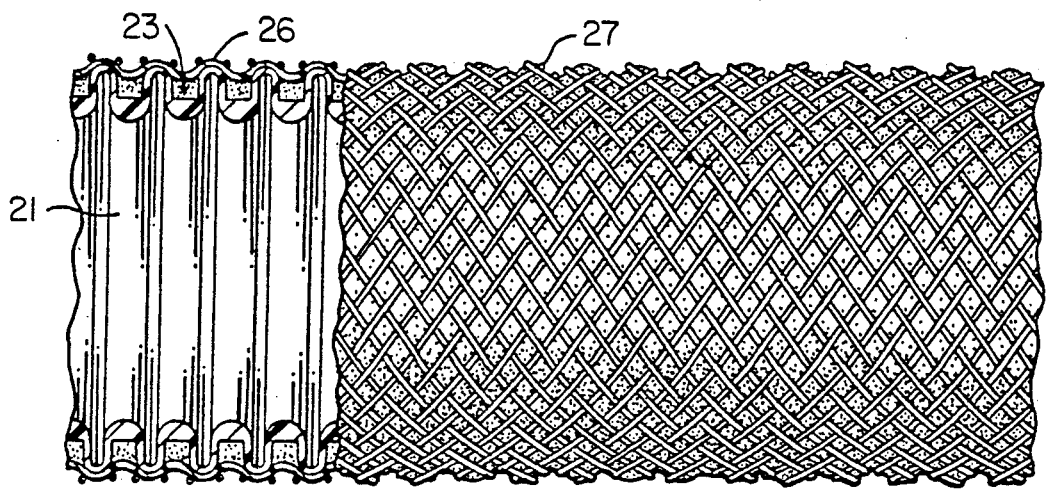
FIG.4
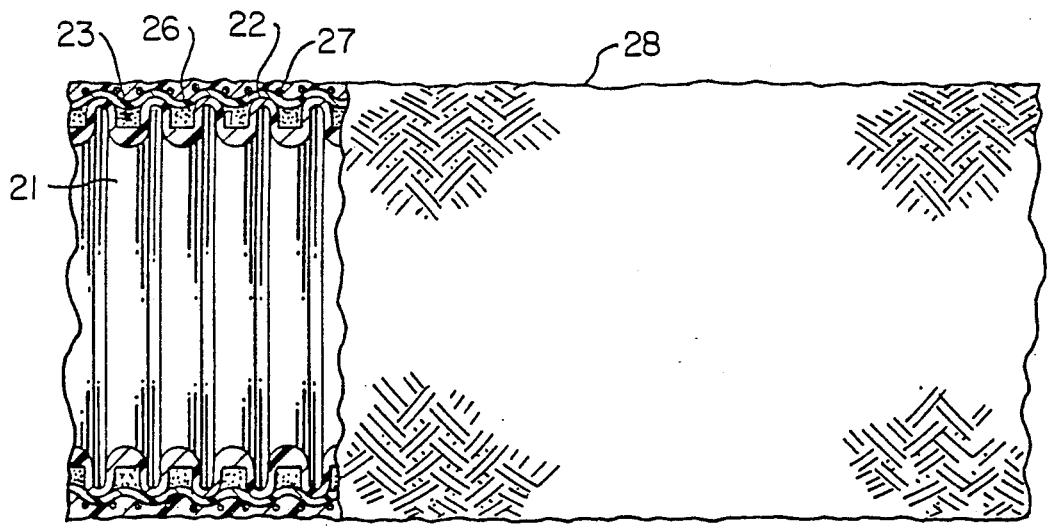
FIG.5
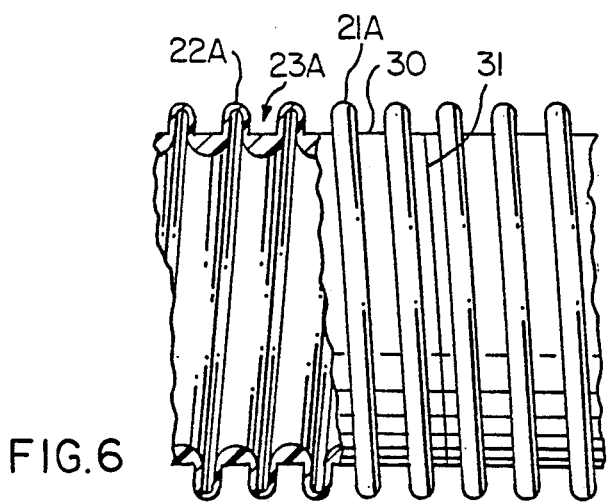
FIG.6
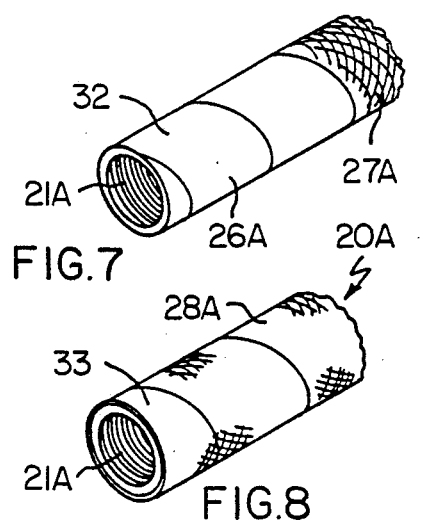
FIG.7
FIG.8

FLEXIBLE HOSE CONSTRUCTION

CROSS REFERENCE TO RELATED APPLICATIONS

This application is a continuation-in-part patent application of its copending parent patent application Ser. No. 405,487, filed Sep. 11, 1989, now U.S. Pat. No. 5,089,074.

BACKGROUND OF THE INVENTION

1. Field of the Invention

This invention relates to a new flexible hose construction and to a new method of making such a flexible hose construction.

2. Prior Art Statement

It is known to provide a flexible hose construction comprising an inner corrugated hose made of polymeric material and having a plurality of outwardly convex projections with recesses therebetween and extending from one end thereof to the other end thereof, and an outer sleeve of reinforcing material disposed in telescoping relation on the inner hose. For example, see the U.S. patent to Medford et al, No. 4,415,389.

It is also known to dispose a tube of polymeric material inside a corrugated hose and have its outer peripheral surface means engaging the inwardly facing convex projections thereof in a generally straight-line manner from one end of the corrugated hose to the other end thereof. For example, see the U.S. patent to Kleykamp, No. 4,312,383.

SUMMARY OF THE INVENTION

It is one feature of this invention to provide a new flexible hose construction wherein the flexibility characteristics of an inner corrugated hose thereof are not substantially diminished by having an outer sleeve of reinforcing material extend into the outwardly facing recesses defined by the corrugations of the inner hose an amount that would diminish such flexibility characteristics.

In particular, it was found according to the teachings of this invention that a tube of polymeric material can be disposed between the sleeve of reinforcing material and the inner hose and have its inner peripheral surface engaging the outwardly facing convex projections from the one end to the other end of the inner hose so as to tend to prevent the sleeve of reinforcing material from entering into the outwardly facing recesses of the inner hose an amount that would tend to substantially reduce the flexibility characteristics of the corrugated inner hose.

In this manner, it was found according to the teachings of this invention, that the inner corrugated hose could be formed of a thermoplastic material that readily permits the flexible hose construction to be utilized for conveying a volatile liquid therethrough, such as gasoline for transportation vehicles and the like, and still permit the hose construction to be sufficiently flexible and lightweight so that the same can be readily bent into the desired shape thereof for its intended conveying purpose.

For example, one embodiment of this invention provides a flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on the inner hose, and a tube of polymeric material disposed between the sleeve of reinforcing material and the inner hose and extending in a generally straight-line manner from projection to projection of the inner hose so as to tend to prevent the sleeve of reinforcing material from entering into the recesses of the inner hose an amount that would tend to substantially reduce the flexibility characteristics of the inner hose.

However, it is believed according to the teachings of this invention that a second tube of polymeric material can be disposed inside the inner hose and have its outer peripheral surface engaging the inwardly facing convex projections of the inner hose in a generally straight-line manner from the one end of the inner hose to the other end thereof.

In this manner, it is believed that the second tube could be formed of a thermoplastic material that readily permits the flexible hose construction to be utilized for conveying a volatile liquid therethrough, such as gasoline for transportation vehicles and the like, and still permit the hose construction to be sufficiently flexible and lightweight so that the same can be readily bent into the desired shape thereof for its intended conveying purpose.

For example, another embodiment of this invention provides a flexible hose construction comprising an inner corrugated hose made of polymeric material and having a plurality of outwardly facing convex projections with outwardly facing recesses therebetween and extending from one end thereof to the other end thereof, the inner hose having a plurality of inwardly facing convex projections with inwardly facing recesses therebetween and extending from the one end thereof to the other end thereof, an outer sleeve of reinforcing material disposed in telescoping relation on the inner hose, a first tube of polymeric material disposed between the sleeve of reinforcing material and the inner hose and having an inner peripheral surface means engaging the outwardly facing convex projections in a generally straight-line manner from the one end thereof to the other end thereof so as to tend to prevent the sleeve of reinforcing material from entering into the outwardly facing recesses of the inner hose an amount that would tend to substantially reduce the flexibility characteristics of the inner hose, and a second tube of polymeric material disposed inside the inner hose and having an outer peripheral surface engaging the inwardly facing convex projections in a generally straight-line manner from the one end thereof to the other end thereof.

Accordingly, it is an object of this invention to provide a new flexible hose construction having one or more of the novel features of this invention as set forth above or hereinafter shown or described.

Another object of this invention is to provide a new method of making such a flexible hose construction, the method of this invention having one or more of the novel features of this invention as set forth above or hereinafter shown or described.

Other objects, uses and advantages of this invention are apparent from a reading of this description which proceeds with references to the accompanying drawings forming a part thereof and wherein:

BRIEF DESCRIPTION OF THE DRAWINGS

FIG. 1 is a fragmentary perspective view, partially in cross section, and illustrating the new flexible hose construction of this invention.

FIG. 2 is an enlarged fragmentary side view, partially in cross section, and illustrating the inner corrugated hose of the hose construction of FIG. 1.

FIG. 3 is a view similar to FIG. 1 and illustrates the inner corrugated hose of FIG. 2 having a unique tube of polymeric material disposed thereon according to the method of this invention.

FIG. 4 is a view similar to FIG. 3 and illustrates how a sleeve of reinforcing material is disposed on top of the tube of polymeric material that has been placed on the inner corrugated hose as illustrated in FIG. 3.

FIG. 5 is a view similar to FIG. 4 and illustrates how an outer polymeric layer is disposed over the reinforcing sleeve of FIG. 4 to complete the hose construction that is illustrated in FIG. 1.

FIG. 6 is a fragmentary view similar to FIG. 1 and illustrates another embodiment of the inner corrugated hose.

FIG. 7 is a fragmentary perspective view similar to FIG. 1 and illustrates how a tube of polymeric material and a reinforcing sleeve can be disposed in series on the corrugated hose of FIG. 6.

FIG. 8 is a view similar to FIG. 7 and illustrates a completed hose construction of this invention made from the structure of FIG. 7 by having an outer polymeric layer disposed over the reinforcing layer of the structure of FIG. 7.

FIG. 9 is an enlarged fragmentary cross-sectional view of another inner hose of this invention for the hose constructions of this invention.

DESCRIPTION OF THE PREFERRED EMBODIMENTS

Figure 10:
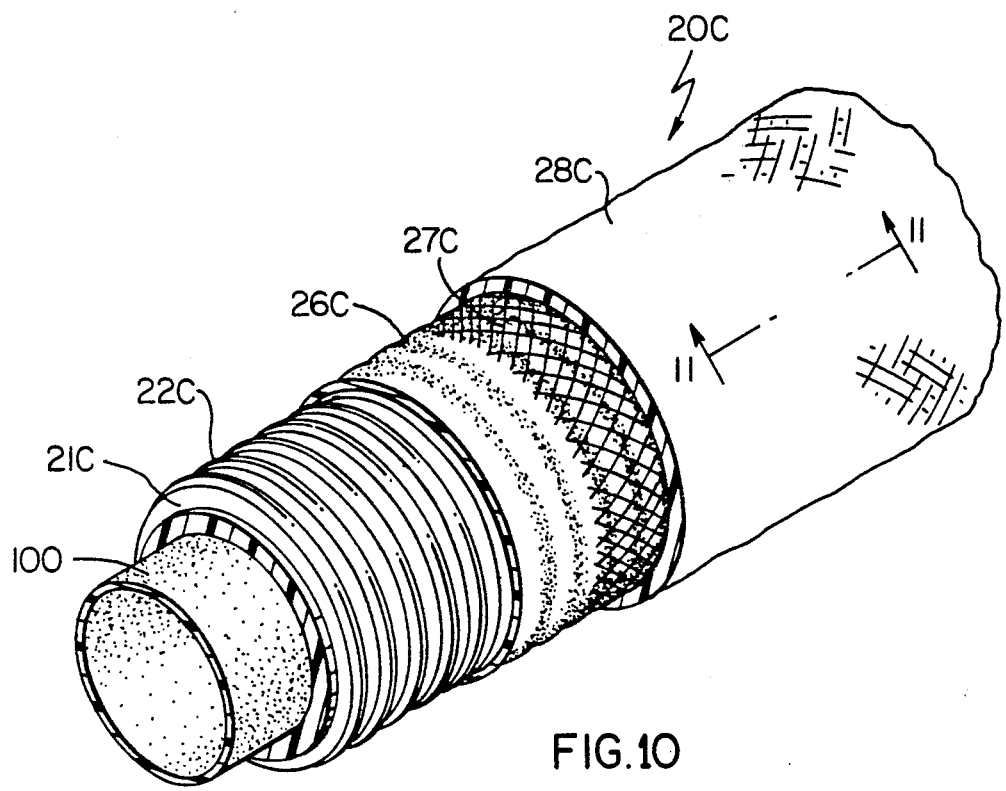
FIG. 10 is a view similar to FIG. 1 and illustrates another new hose construction of this invention, FIG. 10 illustrating certain parts of the hose construction broken away.

While the various features of this invention are hereinafter illustrated and described as being particularly adapted to provide a flexible hose construction for conveying gasoline and like volatile liquids therethrough, it is to be understood that the various features of this invention can be utilized singly or in various combinations thereof to provide a flexible hose construction for conveying any other fluid therethrough for other types of apparatus as desired.

Therefore this invention is not to be limited to only the embodiments illustrated in the drawings, because the drawings are merely utilized to illustrate one of the wide variety of uses of this invention.

As previously stated it is one feature of this invention to dispose a second tube of polymeric material inside an inner corrugated tube of each of the hose constructions set forth in the aforementioned copending parent patent application, Ser. No. 405,487, filed Sep. 11, 1989, such as tube 100 of FIGS. 10 and 11 and tube 100D of FIGS. 12 and 13.

Therefore, it is believed that it would be best to first fully set forth the structures and methods of such copending parent patent application before describing the hose constructions of this invention that are generally indicated by the reference numerals 20C and 20D in FIGS. 10-13 while the hose constructions of such copending parent patent application are illustrated in FIGS. 1-9.

Referring now to FIG. 1, the new flexible hose construction of this invention is generally indicated by the reference numeral 20 and comprises an inner corrugated hose 21 formed of any suitable polymeric material and having a plurality of outwardly convex projections 22 with recesses 23 therebetween and extending from one end 24 to the other end 25 thereof, a tube 26 of any suitable polymeric material extending in a generally straight-line manner from projection 22 to projection 22 as illustrated in FIG. 3, an outer sleeve 27 of reinforcing material disposed in telescoping relation on the tube 26, and an outer layer 28 of any suitable polymeric material that will provide a protection for the sleeve 27 of reinforcing material and also to tend to prevent any liquid that is conveyed through the flexible hose construction 20 from permeating to the exterior thereof, such as gasoline and the like.

As previously stated, it was found according to the teachings of this invention that the hose construction 20 can be relatively flexible because of the corrugated inner hose 21 thereof.

However, it was further found according to the teachings of this invention that the flexibility characteristics of such a hose construction 20 is diminished if a sufficient amount of the reinforcing means 27 is received in the recesses 23 of the inner hose 21 to resist the bending thereof.

Therefore, it was further found according to the teachings of this invention that by providing the tube 26 of polymeric material on the inner hose 21 before disposing the reinforcing sleeve 27 thereon with the tube 26 being so constructed and arranged that the same extends substantially from the apex 29 of one projection 22 to the next apex 29 of the next adjacent projection 22 in a substantially straightline manner illustrated in FIG. 3, the tube 26 will substantially resist the penetration of the reinforcing layer 27 into the recesses 23 of the inner hose 21 to any great degree even though the reinforcing layer 27 is being forced radially inwardly either through the normal effect of applying the same onto the inner hose 21 and/or by the force of the outer cover 28 being applied over the reinforcing means 27 in a conventional hose forming manner, such slight penetration of the reinforcing means 27 being illustrated in FIGS. 4 and 5, whereby it can be seen that the recesses 23 remain substantially void of the reinforcing means 27 so as to retain the desired flexibility characteristics of the inner hose 21.

While the inner hose 21 of the hose construction 20 of this invention can be formed of any suitable material and in any suitable manner, one working embodiment thereof comprises thermoplastic material that is blow molded in a conventional manner into the configuration illustrated in FIG. 2 wherein the convolutions or projections 22 thereof are annular and are uniformly spaced from each other throughout the length of the hose 21 or can be disposed in a helical manner throughout the length of the hose as represented by the projections 22A illustrated in FIG. 6 wherein another inner hose of this invention is indicated by the reference numeral 21A and parts thereof similar to the inner hose 21 previously described are indicated by like reference numerals followed by the reference letter "A". The inner hose 21A is made in a conventional manner by spirally wrapping a strip 30 that has the projections 22A and recesses 23A formed therein in any suitable manner and forming a helically disposed seam 31 throughout the length of the inner hose 21A.

One problem with thermoplastic hoses currently being made is the stiffness thereof when compared to elastomeric rubber hoses of the same inner and outer dimensions. The stiffness of the prior known thermoplastic hoses is due to the rigidity of the plastic material. However, by using a convoluted or corrugated inner tube, the flexibility of the thermoplastic hose can be made greater than a rubber hose of the same size. The convolutions can be annular in nature and their geometry can be dependent upon the size of the hose to be produced.

A thermoplastic hose with a corrugated inner tube also has other advantages over conventional rubber hoses.

In particular, a plastic hose construction built with a convoluted inner corrugated hose has better kink resistance and a smaller bend radius than a rubber hose of the same size.

These properties are a result of the annular rings that form the convoluted tube. These annular rings provide hoop strength that results in superior kink resistance and smaller bend radius compared to smooth inner tube hoses.

Also, a corrugated inner hose of plastic material is lighter in weight per foot than a rubber hose. To reduce kinking and bend radius, conventional rubber hoses rely on thick hose walls and/or a helix wire. In contrast, the corrugated plastic hose 21 of this invention provides an excellent kink resistance so that a lightweight, thin wall hose construction 20 can be built without compromising kink resistance or bend radius.

The long-term resistance of plastic materials to degradation and wear is greater than that of rubber materials. For example, a large number of plastic materials are available with much better resistance to hydrocarbon-based liquids, such as gasoline, than standard rubber compounds. Certain thermoplastics offer greater ozone, abrasion and UV resistance than rubber compounds. Thermoplastics are also more easily colored and are more colorfast.

Therefore, the thermoplastic material of the inner hose 21 of this invention is chosen based on the chemical and thermal resistance requirements of the application of the hose construction 20 and based on a means to bond the corrugated inner hose 21 to the subsequently disposed layers thereon.

Thus, the inner hose 21 can comprise a single layer of a homogeneous thermoplastic material as illustrated in FIGS. 2-6 or the same can comprise an inner layer 21' of one type of thermoplastic material and an outer layer 21" of another type of thermoplastic material as provided for the inner hose 21B illustrated in FIG. 9 as it is well known that two plastic materials can be extruded together to form a tubular member having one material forming the outer surface thereof and the other material forming the inner surface thereof and thereafter such tubular member can be blow molded to form the same into a corrugated tubular member.

In any event, the tube 26 of polymeric material can be applied over the inner hose 21 either as a continuous tube by conventional extruding apparatus whereby the exuding tube 26 bonds by the nature thereof to the apexes 29 of the projections 22 in the substantially straight-line manner illustrated in FIG. 3 or the tube 26 could be disposed in a spiral manner as illustrated in FIG. 7 and comprise a strip 32 of polymeric material that is helically wound onto the inner tube 21A as illustrated in FIG. 7. However, it is to be understood that the inner tube 21A illustrated in FIG. 7 could be the inner tube 21 of FIG. 2 or the inner tube 21B of FIG. 9 rather than a tube wherein the projections are disposed in a helical manner, as desired.

In any event, it can be seen that the tube 26 provides a smooth surface over the convolutions 22 and provides a consistent base for receiving the reinforcement 27 thereon. The material of the tube 26 can be chosen so that it will adhere to the outer surface of the apexes 29 of the inner tube 21 so that the layer 26 does not fill the recesses 23 of the inner tube 21 and is applied in a manner to just cover the convolutions 22 in substantially the straight-line manner illustrated in FIG. 3 because, as previously stated, if the layer 26 were to fill the recesses 23, not only would the tube 26 then reduce the flexibility of the inner hose 21, but also the same would then allow the reinforcement 27 to enter those recesses 23 to further reduce the flexibility of the inner hose 21.

After the outer tube 26 has been applied in place in the manner previously set forth, the reinforcement sleeve 27 of either a braided textile material or a metal wire material that is wound in alternating directions is disposed over the tube 26 and the amount of reinforcement provided is dependent upon the working pressure requirements of the hose construction 20.

For example, the reinforcement sleeve 27 is illustrated as a braided material in FIG. 4 and thereby comprising a seamless sleeve of such material whereas the reinforcement 27A of FIG. 7 is illustrated as two layers of helically wound wire material disposed in opposite directions on the tube 26A.

In any event, it can readily be seen in FIG. 4 that the reinforcement sleeve 27 does not enter the recesses 23 of the inner hose 21 to any substantial amount because the tube 26 prevents the same from being forced into the recesses 23 as the reinforcement sleeve 27 is being applied to the desired thickness on the inner tube 21.

Thereafter, the outer layer 28 of any suitable polymeric material is applied over the reinforcement 27 such as by being extruded as a continuous tube thereof by conventional extruding apparatus to complete the hose construction 20 or by being applied in a helically wound form thereof from a strip 33 of such outer material in the manner illustrated in FIG. 8 to complete the hose construction 20A.

In any event, the outer layer 28 provides protection for the reinforcement 27 and can readily bond to the inner tube 26 by exuding through the reinforcement 27 in a manner well known in the art and as illustrated in FIG. 5 so as to hold all of the layers of the hose construction 20 in a bonded condition thereof, if desired.

The material of the outer layer 28 not only protects the reinforcement 27 from physical or chemical damage, but also the cover layer 28 is chosen with consideration to the environment and bondability to the other layers of the hose construction 20. In addition, the material 28 can be chosen so as to tend to prevent the liquid flowing through the hose construction 20 from permeating through the hose construction 20 to the exterior thereof.

As previously stated, the materials of the hose construction 20 of this invention can be any suitable materials that function in the manner previously set forth.

Therefore, the following example of one working embodiment of the hose construction 20 of this invention is not to be a limitation on this invention and is merely being given as one working example thereof.

In the one working embodiment of this invention, the inner hose is formed in the manner of FIG. 9 with the inner layer 21' comprising a thermoplastic material sold by DuPont as Zytel ST811HS and with the outer layer 21" thereof comprising a thermoplastic material sold by the B. F. Goodrich Company as ESTANE 5710F1. Such material is blow molded to form the hose 21B with an inside diameter of approximately 1.500 of an inch and with the distance between the apexes 29B of the projections 22B being approximately 0.246 of an inch. The thickness of the inner portions 34 of the hose 21B is approximately 0.045 of an inch while the sidewalls 35 between the portion 34 and the apexes 29B are actually disposed at an angle relative to each other rather than being parallel to each other as illustrated in FIGS. 2 and 3, such angle of each sidewall 35 being approximately 10° to a true transverse line passing through the inner hose 21B.

The tube 26 in such working embodiment of the hose construction 20 of this invention also comprises the thermoplastic material ESTANE 5710F1 and is approximately 0.040 of an inch thick while the reinforcement 27 comprises a polyester yarn formed on a thirty-six carrier braiding machine with two ends per carrier and the outer layer 28 comprises the thermoplastic material ESTANE 5710F1 and is approximately 0.060 of an inch thick.

In this manner, the thermoplastic material of the cover 28 readily bonds to the tube 26 and the thermoplastic material of the tube 26 readily bonds to the outer layer 21" of the inner tube 21B.

Therefore, it can be seen that the resulting hose construction 20 on 20A of this invention is readily adapted to be utilized for conveying any desired fluid therethrough, such as a volatile liquid, and will permit the hose construction 20 or 20A to be disposed in a bent configuration for such purpose as desired.

As previously stated, it is believed according to the teachings of this invention that a second tube of any suitable polymeric material can be disposed inside any of the hose constructions 20, 20A, etc., previously described and still permit the resulting hose construction to be relatively flexible for its intended purpose while such second tube of polymeric material will provide for a smooth flow of fluid therethrough as well as provide a layer of material inside the hose construction that is more likely to resist any adverse reactions from the type of fluid being conveyed through such a hose construction.

Figure 11:
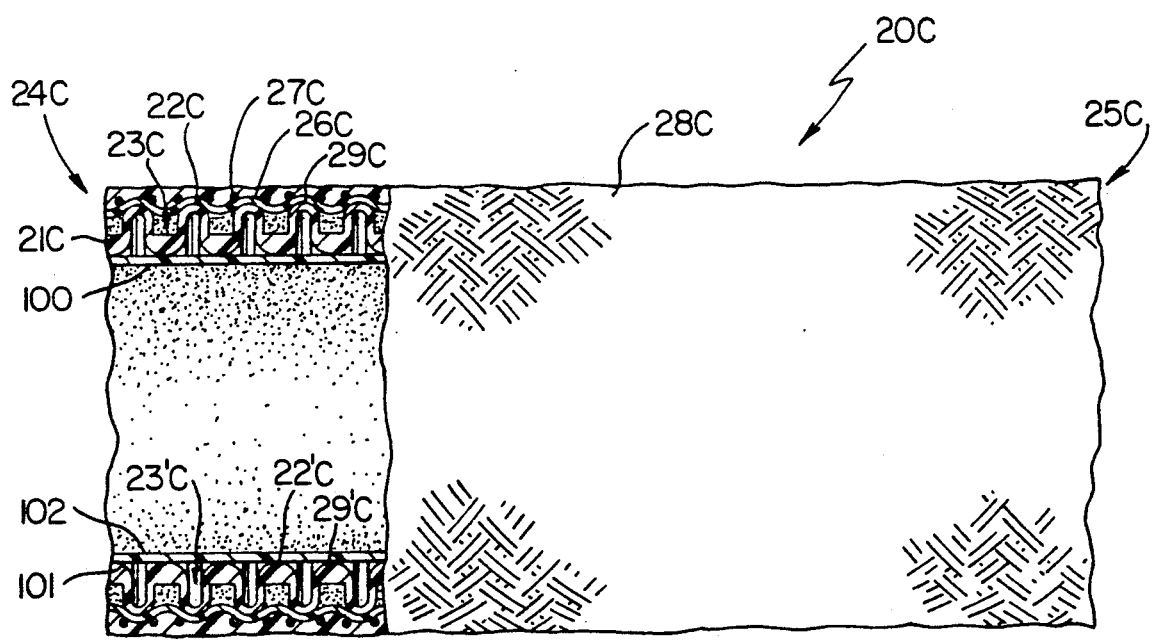
FIG. 11 is an enlarged fragmentary cross-sectional view taken on line 11—11 of FIG. 10.

In particular, another new hose construction of this invention is generally indicated by the reference numeral 20C in FIGS. 10 and 11 and parts thereof similar to the hose construction 20 and 20A previously set forth are indicated by like reference numerals followed by the reference letter "C".

As illustrated in FIGS. 10 and 11, it can be seen that the inner corrugated tube 21C of the hose construction 20C has the outwardly facing convex projections 22C and outwardly facing recesses 23C therebetween, such outwardly facing projections 22C defining inwardly facing recesses 23'C and such outwardly facing recesses 23C defining inwardly facing convex projections 22'C as illustrated in FIG. 11.

The hose construction 20C has the first tube of polymeric material 26C bonded or otherwise secured to the apexes 29C of the outwardly facing projections 22C in the manner previously set forth together with the reinforcement layer 27C and the outer cover material 28C respectively disposed thereon in the manner previously set forth.

However, before the inner corrugated hose 21C is formed, the second tube 100 is first formed in any suitable manner so as to have a smooth external peripheral surface 101 and a substantially smooth inner peripheral surface 102 while being formed of any suitable polymeric material. Thereafter, the inner corrugated tube 21C is blow molded onto the tube 100 in such a manner that the inwardly facing projections 22'C of the forming hose 21C engage against the external peripheral surface 101 of the tube 100 and, in fact, bond thereto by the nature of the material thereof so that the outer peripheral surface 101 of the second tube 100 engages the inwardly facing convex projections 22'C at the apexes 29'C thereof in a generally straight-line manner from one end 24C to the other end 25C of the hose construction 20C. Thereafter, the tube 26C, reinforcement sleeve 27C and cover 28C are serially disposed on the inner corrugated hose 21C in the manner previously set forth to complete the hose construction 20C of this invention.

While the hose construction 20C of this invention has been previously described as first forming the inner tube 100 before the corrugated hose 21C is formed thereon, it is to be understood that the hose 21C could be formed first with the inner tube 100 being subsequently formed therein, the hose 21C and the inner tube 100 could be separately formed and then be assembled together, or the inner hose 100 and corrugated hose 21C could be substantially simultaneously formed together in substantially the same manner as set forth in the aforementioned Kleykamp, U.S. Pat. No. 4,312,383, whereby this patent is being incorporated into this disclosure by this reference thereto.

In any event, it is believed that the tube 100 will not diminish the flexibility characteristics of the hose construction 20C to any great amount so that the hose construction 20C can be utilized in any of the manners as the hose constructions 20 and 20A previously described or for other purposes as desired.

In fact, should the inner hose 21C be formed in the manner illustrated in FIG. 9 wherein an outer layer of material 21" and an inner layer 21' is provided, it is believed that such inner layer 21' could be selected so as to be readily bondable and/or compatible with the material of the tube 100 of this invention so that the tube 100 could be of a material other than the material that forms the outer tube 26C as desired.

Figure 12:
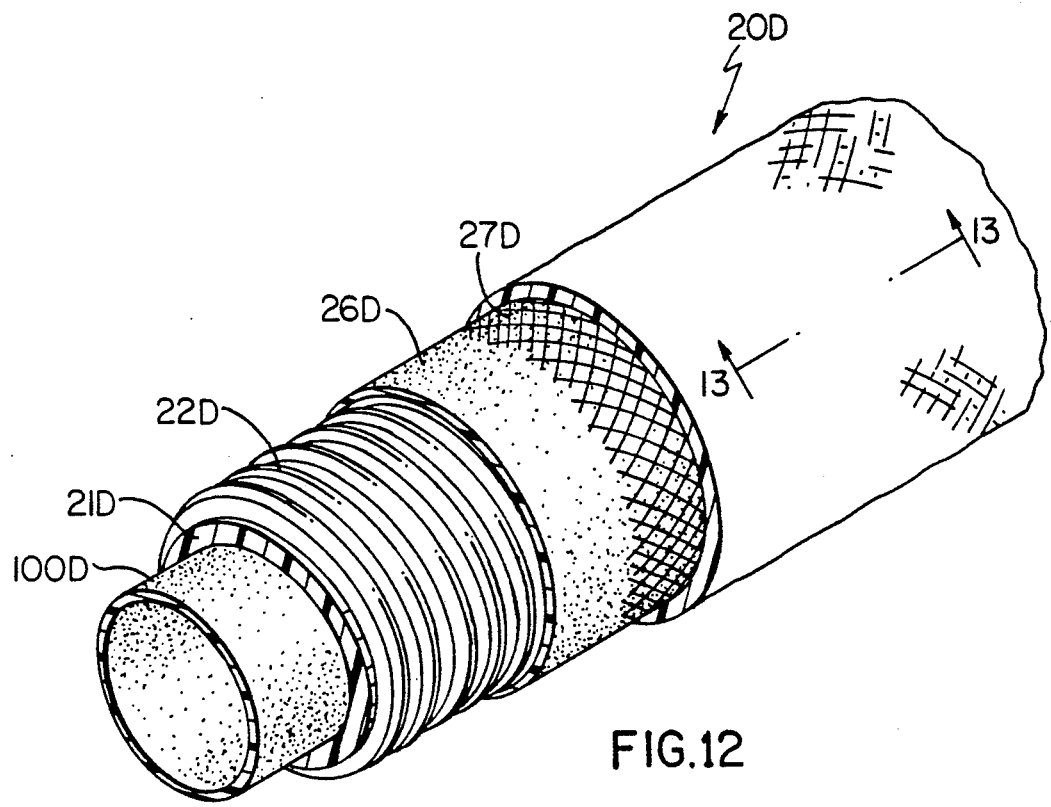
FIG. 12 is a view similar to FIG. 10 and illustrates another hose construction of this invention.
Figure 13:
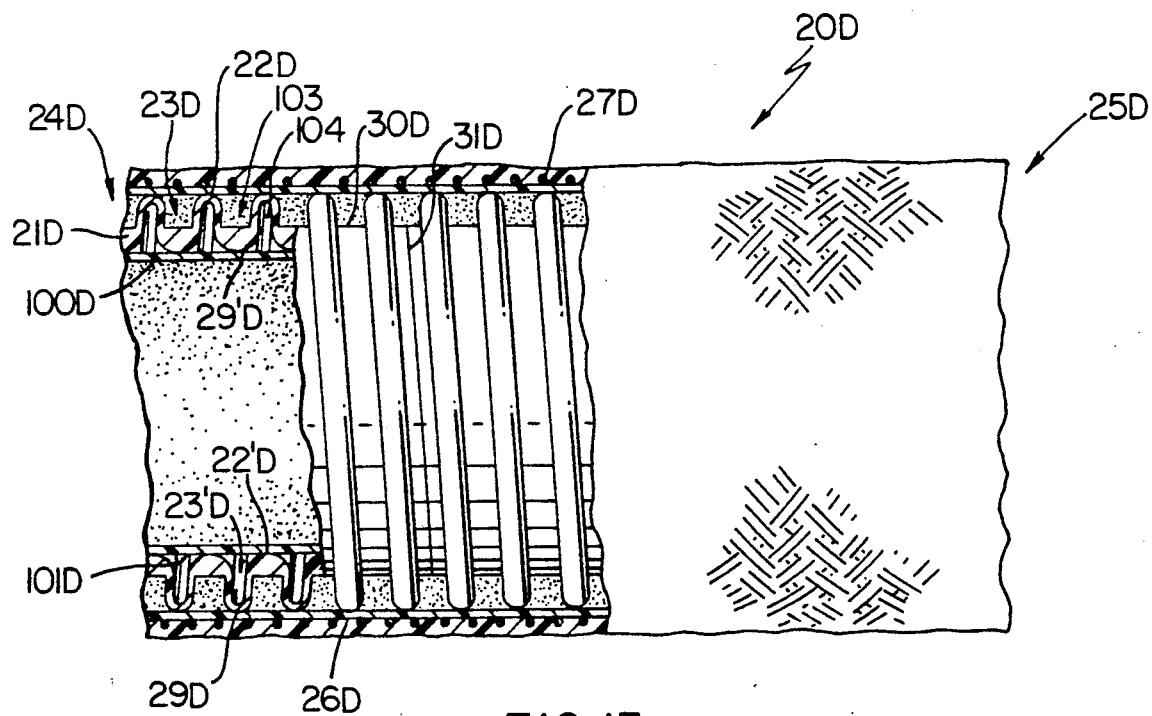
FIG. 13 is an enlarged fragmentary cross-sectional view taken on line 13—13 of FIG. 12.

Further, while the inner tube 21C is illustrated as having the projections 22C and 22'C thereof each being annular so as to be disposed substantially transverse to the longitudinal axis of the hose construction 20C, it is to be understood that the inner hose could have the projections thereof disposed in helical paths, if desired, in the same manner as provided by the strip 30 of FIG. 6 whereby another hose construction of this invention is generally indicated by the reference numeral 20D in FIGS. 12 and 13 and parts thereof similar to the parts of the hose construction 20, 20A and 20C previously described are indicated by like reference numerals followed by the reference letter "D".

As illustrated in FIGS. 12 and 13, the hose construction 20D is substantially the same as the hose construction 20C previously set forth except that the outwardly facing projections 22D, outwardly facing recesses 23D, inwardly facing projections 22'D and inwardly facing recesses 23'D are all disposed in helical paths from the one end 24D of the hose construction 20D to the other end 25D thereof as illustrated in FIG. 13 while the various parts of the hose construction 20D are formed in the same manner as the hose construction 20C previously set forth.

Thus, it can be seen that the inner hose 21D of the hose construction 20D can be formed as a helical strip 30D and be helically disposed on the inner tube 100D to form the seam 31D as previously set forth in FIG. 6 while the inwardly facing projections 21'D are disposed in engagement with the external peripheral surface 101D of the inner tube 100D and be bonded thereto as previously set forth.

When the apexes 29'D of the inner tube 21D are bonded to the external peripheral surface 101D of the inner tube 100D, and the strip 30D of the tube 21D has the seams 31D thereof sealed together in any suitable manner, it can be seen that one helically disposed passage 103 is formed between the outwardly facing recesses 23D of the inner tube 21D and the outer tube 26D while another helically disposed passage 104 is defined between the inwardly facing recesses 23'D and the inner tube 100D whereby the passages 103 and 104 can be utilized for any desired purpose, such as for leak detection purposes, conveying like or different fluids from one end 24D to the other end 25D of the hose construction 20D, etc.

In any event, it can be seen that the hose construction 20C or 20D of this invention can be formed in a relatively simple manner by the methods of this invention to provide a hose construction for conveying volatile fluids through the inner tube 100 or 100D thereof for the same reason as the hose constructions 20 and 20A as previously described.

Thus, it can be seen that this invention provides a new flexible hose construction and a new method of making such a flexible hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a flexible hose construction comprising an inner corrugated hose made of polymeric material and having a plurality of outwardly facing convex projections with outwardly facing recesses therebetween and extending from one end thereof to the other end thereof, said inner hose having a plurality of inwardly facing convex projections with inwardly facing recesses therebetween and extending from said one end thereof to said other end thereof, and an outer sleeve of reinforcing material disposed in telescoping relation on said inner hose, the improvement comprising a first tube of polymeric material disposed between said sleeve of reinforcing material and said inner hose and having an inner peripheral surface engaging said outwardly facing convex projections in a generally straight-line manner from said one end thereof to said other end thereof so as to tend to prevent said sleeve of reinforcing material from entering into said outwardly facing recesses of said inner hose an amount that would tend to substantially reduce the flexibility characteristics of said inner hose, and a second tube of polymeric material disposed inside said inner hose and having an outer peripheral surface engaging said inwardly facing convex projections in a generally straight-line manner from said one end thereof to said other end thereof, said inner hose being formed of thermoplastic material, said inner hose being formed with an outer layer of one type of thermoplastic material and an inner layer of another type of thermoplastic material.

2. A flexible hose construction as set forth in claim 1 wherein said first tube of polymeric material is bonded to said outwardly facing convex projections of said inner hose.

3. A flexible hose construction as set forth in claim 1 wherein said second tube of polymeric material is bonded to said inwardly facing convex projections of said inner hose.

4. A flexible hose construction as set forth in claim 1 wherein said projections of said inner hose are annular and are disposed substantially transverse to the longitudinal axis of said hose construction.

5. A flexible hose construction as set forth in claim 1 wherein said first tube of polymeric material is formed of the same type of thermoplastic material that forms said outer layer of said inner hose and is bonded to said outwardly facing convex projections thereof.

6. A flexible hose construction as set forth in claim 5 and including an outer sleeve of polymeric material telescopically disposed on said sleeve of reinforcing material, said outer sleeve of polymeric material being formed of the same type of thermoplastic material that forms said first tube of polymeric material and being bonded thereto through said sleeve of reinforcing material.

7. A flexible hose construction as set forth in claim 1 wherein said second tube of polymeric material is formed of the same type of thermoplastic material that forms said inner layer of said inner hose and is bonded to said inwardly facing convex projections thereof.

8. A flexible hose construction as set forth in claim 1 and including an outer sleeve of polymeric material telescopically disposed on said sleeve of reinforcing material.

9. A flexible hose construction as set forth in claim 8 wherein said outer sleeve of polymeric material is bonded to said first tube of polymeric material through said sleeve of reinforcing material.

* * * * *